(12) United States Patent
Sano

(10) Patent No.: US 6,615,459 B2
(45) Date of Patent: Sep. 9, 2003

(54) HOLDING FASTENER

(75) Inventor: Takahiro Sano, Toyohashi (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 09/847,988

(22) Filed: May 3, 2001

(65) Prior Publication Data

US 2002/0002762 A1 Jan. 10, 2002

(30) Foreign Application Priority Data

May 11, 2000 (JP) ........................................ 2000-138803

(51) Int. Cl.$^7$ .............................................. A44B 21/00
(52) U.S. Cl. ............................ 24/453; 24/297; 24/606; 411/38; 411/344
(58) Field of Search .................................. 411/344, 342, 411/340, 341, 343, 345, 346, 38, 34, 508, 913, 509, 510, 572; 24/606, 607, 297, 453, 293–295, 289, 115 F, 602, 704.1, 704.2, DIG. 32, DIG. 35, 581.11; 174/138 D; 403/2, 408.1; 292/307 A, 307 R

(56) References Cited

U.S. PATENT DOCUMENTS

| | | | |
|---|---|---|---|
| 2,404,169 A | * | 7/1946 | Gidden |
| 3,438,302 A | * | 4/1969 | Sandor |
| 3,875,843 A | * | 4/1975 | Maeda et al. |
| 4,022,100 A | * | 5/1977 | Johnson |
| 4,890,966 A | * | 1/1990 | Umezawa |
| 5,417,531 A | | 5/1995 | Brown |
| 5,533,851 A | * | 7/1996 | Remmers |
| 5,775,861 A | * | 7/1998 | Leon et al. |
| 5,991,984 A | | 11/1999 | Schaty |
| 6,004,088 A | * | 12/1999 | Hunt |

FOREIGN PATENT DOCUMENTS

| | | |
|---|---|---|
| EP | 717202 | 6/1996 |
| JP | 8054010 | 2/1996 |
| JP | 9042247 | 2/1997 |

* cited by examiner

Primary Examiner—James R. Brittain
(74) Attorney, Agent, or Firm—Edward D. Murphy

(57) ABSTRACT

A holding fastener 1 comprising a shank 3 adapted to be inserted into a mounting hole of an attachment member. The holding fastener having a first holding portion 5 disposed at one end of the shank and adapted to extend radially and outward from the mounting hole of the attachment member to engage and hold one surface of the attachment member, and a second holding portion 6 disposed at the other end of the shank and adapted to engage and hold the other surface of the attachment member. The second holding portion 6 includes a holding piece 9 connected to the shank 3 through a hinge 7 to allow the holding piece to be pivoted or rotated between an insertion position extending along the axis of the shank and a holding position extending orthogonal to the axis of the shank. An insertion tube 15 is provided at the one end of the shank. The insertion tube 15 is adapted to be inserted axially into a hollow portion of the shank from the side of the first holding portion to the side of the second holding portion. The holding piece 9 and the insertion tube 15 are cooperatively formed so that the end of the insertion tube inserted into the hollow portion of the shank allows the holding piece to be rotated from the insertion position to the holding position to be locked in the holding position.

7 Claims, 5 Drawing Sheets

HOLDING FASTENER

BACKGROUND OF THE INVENTION

The present invention relates to a holding fastener suitable for fastening a sheet-like or plate-like attachment member such as a silencer board (noise insulating board) of automobiles to a mounting member such as an automobile body.

Various holding fasteners have been known to assemble the sheet-like member such as a silencer board to another mounting member such as an automobile body. For instance, such holding fasteners are described in Japanese Utility Model Laid-Open No. 59-92213, Japanese Utility Model Laid-Open No. 62-45412, European Patent No. 0717202 and Japanese Patent Laid-Open No. 09-042247. In these conventional holding fasteners for the sheet-like member, the holding fastener is attached to the sheet-like member with pressing one surface of the sheet-like member by a flange or the like of the fastener and pressing the other surface of the sheet-like member by a pantograph-shaped foldable arm of the fastener. Thus, the holding fastener may be pre-assembled to the sheet-like member and the sheet-like member may be readily attached to the automobile body by aligning the holding fastener with a stud bolt projectingly disposed on the automobile body and then simply pushing in the holding fastener as-is. However, for pre-assembling such holding fasteners to the sheet-like member, an operation for folding the pantograph-shaped arm is required. Further, this operation undesirably is required to be done from the reverse side to the inserting direction of the holding fastener (i.e. from the backside of the sheet-like member). Japanese Patent Laid-Open No. 09-042247 describes that the assembling operation may be carried out from one side of the attachment member. However, this describes in connection with a case that an attachment member is positioned to a stud bolt of another mounting member without pre-assembling a holding fastener and the holding fastener is then pushed into the stud bolt. Thus, if the holding fastener is pre-assembled to the attachment member, it will be necessary to access the backside of the attachment member to fold the pantograph as with the holding fasteners described in the aforementioned other publications.

Japanese Patent Laid-Open No. 08-054010 discloses a clip having a flange disposed at a lower end of a shank of the clip and a flexible engagement arm which extends upward and closely along the shank and has an upper end portion projecting downward and radially outward. This clip may be attached to the attachment member only by an operation of inserting the clip into an insertion hole of the attachment member with making the side of the engagement arm forefront. Thus, the clip may be pre-assembled to the attachment member. However, in order to assure a sufficient engagement area of the flexible engagement arm to the attachment member, it is unavoidable to make the engagement arm longer and the projected amount of the clip from the attachment member is increased in proportion to the increased length of the engagement arm. As a result, it is necessary to secure an additional space over the surface of the attachment member in proportion to the increased projected amount. U.S. Pat. No. 5,991,984 discloses a holding fastener having a pair of holding pieces pivotably or rotatably formed at the end of a shank of the holding fastener wherein the holding pieces are manually rotated to be brought into contact with one surface of an attachment member. This holding fastener is structurally difficult to pre-assemble to the attachment member. Further, if it is intended to pre-assemble the holding fastener by enlarging its flange, it is impossible to achieve the assembling operation from one side of the attaching member.

SUMMARY OF THE PRESENT INVENTION

Thus, it has been desired to provide a holding fastener capable of being pre-assembled to a silencer board, etc through the operation from one side of the silencer board, etc, and capable of keeping the dimension over the attachment member in a small level.

It is an object of the present invention to provide a holding fastener capable of being attached to a sheet-like attachment member such as a silencer board from one side of the attachment member in a pre-assembling operation for attaching the fastener to the attachment member, and capable of reducing the projected amount of the attached fastener from the attachment member to provide a space saving assembly. Also, it is an object of the present invention to provide a holding fastener that is inexpensive to manufacture, reliable to use and simple to install.

In order to achieve the above object, according to the present invention, there is provided a holding fastener to be connected to an attachment member comprising a shank adapted to be inserted into a mounting hole of an attachment member; a first holding portion disposed at one end of the shank and adapted to extend radially and outward from the mounting hole of the attachment member to hold one surface of the attachment member; a second holding portion disposed at the other end of the shank and adapted to hold the other surface of the attachment member, the second holding portion including a holding piece connected to the shank through a hinge to allow the holding piece to be pivoted or rotated between an insertion position that extends along the axis of the shank and a holding position that extends orthogonal to the axis of the shank; the shank includes a hollow portion; and an insertion tube is provided at the one end of the shank and adapted to be inserted axially into the hollow portion of the shank from the side of the first holding portion to the side of the second holding portion, wherein the holding piece and the insertion tube are cooperatively formed so that the end of the insertion tube inserted into the hollow portion of the shank allows the holding piece to be rotated from the insertion position to the holding position to be locked at the holding position. Thus, it is only necessary to insert the shank into the mounting hole from one side of the attachment member and inserting the insertion tube into the shank from the same said one side of the attachment member, the holding piece is folded down to the holding position at the side of the end of the shank to contact in parallel with the surface of the attachment member and is locked to the attachment member on the side opposite the said one side of the attachment member engaged and held by the first holding portion. In addition, since the holding piece contacts in parallel with the surface of the attachment member, the projection over the attachment member is minimized to provide a space saving assembly.

Preferably, the above holding fastener is a plastic one-piece product. In the holding fastener, there are preferably provided a pair of holding pieces opposed to each other in the diametrical direction of the shank to provide a uniform and sufficient holding power. Further, a section of each holding piece adjacent to the corresponding hinge is preferably formed as an insertion tube engagement portion at the insertion position, wherein the insertion tube engagement portion is adapted to be contacted with and pushed out by the end of the insertion tube to rotate each the holding piece from the insertion position to the holding position about the hinge to lock each the holding piece in assembled position.

Preferably, the insertion tube is integrally held to the shank through a connection piece extending from a portion of the shank adjacent to the first holding portion. A pair of the connection pieces are preferably opposed to each other in the diametrical direction of the shank, wherein each the connection piece includes integral hinges at a connected section to the shank, another connected section to the insertion tube and an intermediate section between both the connected sections, wherein the insertion tube is held in a posture and position so that the insertion tube can be axially slid into the shank from the side of the first holding portion to the side of the second holding portion. Thus, the insertion tube may be readily inserted by pushing in from the one side of the attachment member.

Preferably, the insertion tube includes a hollow portion to allow a stud bolt to be inserted thereinto, wherein the insertion tube includes an engagement pawl adapted to engage with a thread of the stud bolt. Preferably, the end of the engagement pawl is located outside the outer periphery of the insertion tube before the insertion tube is inserted into the shank; and when the insertion tube is inserted into the shank, the engagement pawl is moved toward the inside of the insertion tube by the inner wall of the shank to position the end of the engagement pawl at the inside beyond the inner wall of the hollow portion of the insertion tube. This provides more increased engagement force of the engagement pawl to the stud bolt.

The insertion tube preferably includes fastening means for attaching the attachment member to another mounting member, provided at the end on the opposite side of the end of the insertion tube inserted into the shank. A typical example of the fastening means includes an anchor-shaped fastening portion.

BRIEF DESCRIPTION OF THE ACCOMPANYING DRAWINGS

DETAILED DESCRIPTION OF THE PREFERRED EMBODIMENT

Figure 1:
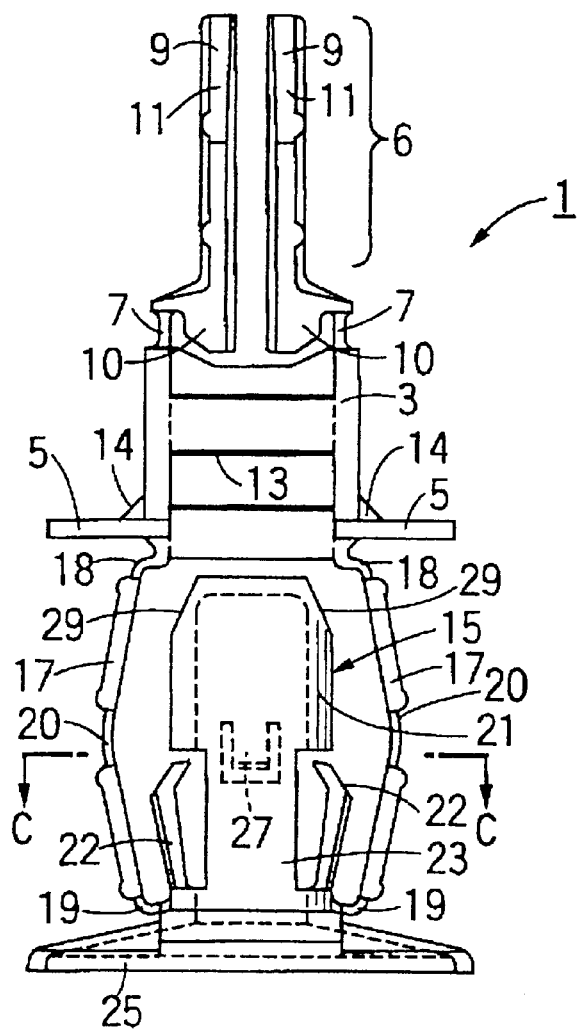
FIG. 1 is a front view of a holding fastener according to a first embodiment of the present invention.
Figure 2:
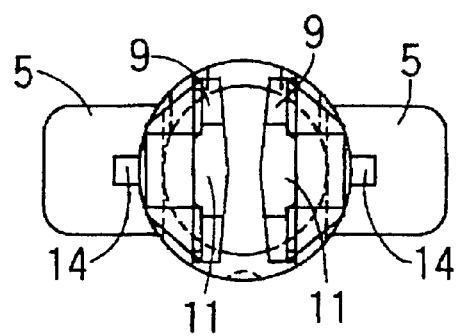
FIG. 2 is a top plan view of the holding fastener of FIG. 1.
Figure 5:
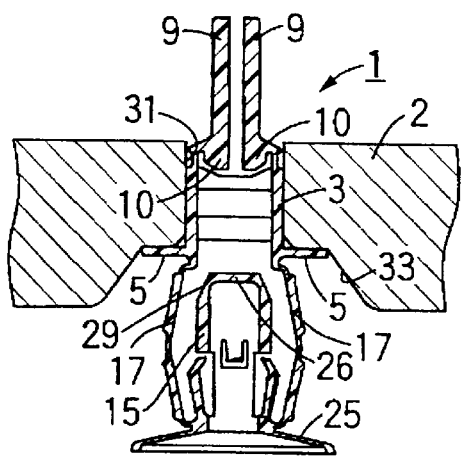
FIG. 5 is a sectional view of the holding fastener according to the first embodiment of the present invention, attached to an attachment member, but prior to being collapsed.
Figure 6:
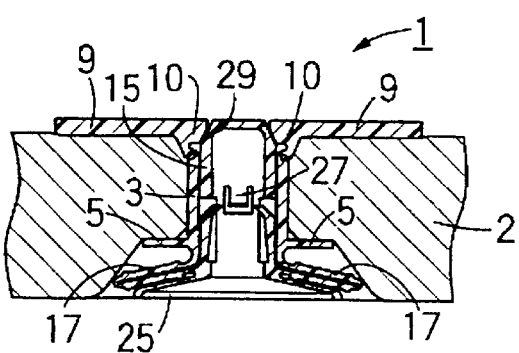
FIG. 6 is a front sectional view of the holding fastener according to the first embodiment of the present invention after being collapsed into an attachment to the attachment member.
Figure 7:
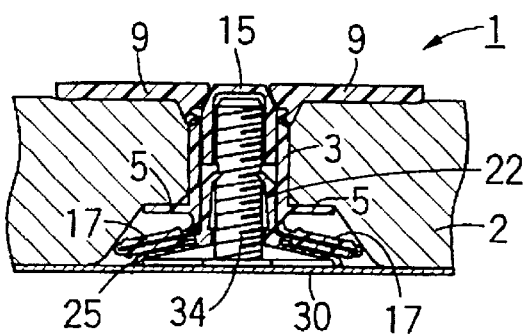
FIG. 7 is a front sectional view of the holding fastener according to the first embodiment of the present invention as shown in FIG. 6 with the attachment member attached to another mounting member.

With reference to the drawings, preferred embodiments of the present invention will now be described. FIGS. 1 to 4 show a structure of a holding fastener 1 according to a first embodiment of the present invention. FIGS. 5 to 7 shows a state when the holding fastener 1 is attached to a sheet-like or plate-like attachment member 2 such as a silencer board (noise insulating board) of automobiles. The holding fastener 1 of the present invention is formed in a plastic, one-piece molded product. The holding fastener 1 comprises a shank 3 adapted to be inserted into a mounting hole of the attachment member 2, a first holding portion 5 disposed at one end (lower end) of the shank 3 and adapted to extend radially and outward from the mounting hole of the attachment member to hold one surface (lower surface in FIGS. 5 to 7) of the attachment member 2, and a second holding portion 6 disposed at the other end of the shank 3 and adapted to hold the other surface (upper surface) of the attachment member 2. As shown in FIGS. 1 and 2, the first holding portion 5 is formed in a pair of elongate plate-like arms extending horizontally. Any suitable shape of the first holding portion 5 may be selected as long as it allows first holding portion 5 to be contacted with one surface of the attachment member 2 to permit the holding fastener 1 to engage the one surface of the attachment member. For example, other shape such as a circular disk-shaped flange may be applied. However, the pair of elongate arms as illustrated provides an advantage of conveniently identifying the orientation of the holding fastener 1 around the axis of the mounting hole.

The second holding portion 6 comprises a holding piece 9 connected to the shank 3 through a hinge 7 to allow the holding piece to be pivoted or rotated between an insertion position (the position in FIGS. 1 and 5) extending along the axis of the shank 3 and a holding position (the position in FIGS. 6 and 7) extending orthogonal to the axis of the shank 3. In the illustrated embodiment, the holding piece 9 is formed as a pair of holding pieces diametrically opposed to each other at the upper end of the shank 3. In the holding position of FIGS. 6 and 7, if the holding pieces 9 are arranged to have the same orientation as that of the first holding portion 5, any operator may identify the holding position of the holding pieces 9, 9 by checking the orientation of the first holding portion 5. As shown in FIG. 1, a portion of each of the holding pieces 9 adjacent to the hinge 7 is formed as an insertion tube engagement portion 10 projecting inward in the axial direction of the shank 3. Each holding piece 9 has a longitudinally extending thick portion to allow the holding fastener to be positioned as pressing the surface of the attachment member with a sufficient strength.

Figure 3:
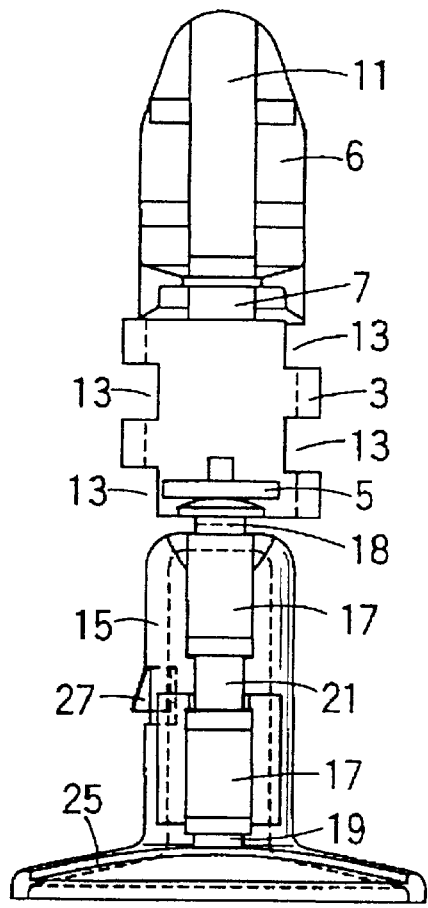
FIG. 3 is a left side view of the holding fastener of FIG. 1.
Figure 4:
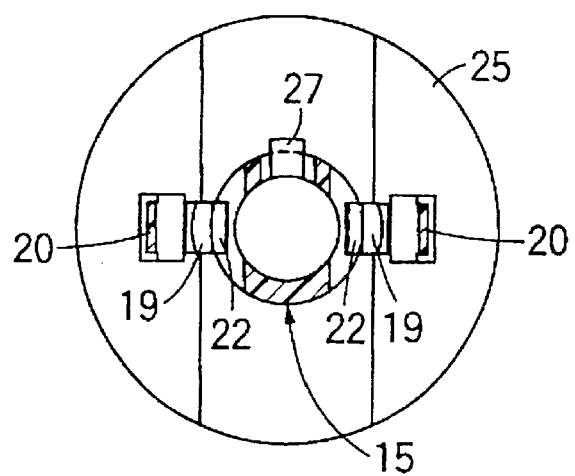
FIG. 4 is a sectional view of the holding fastener, taken along line C—C of FIG. 1.

The shank 3 includes a hollow portion adjacent the hollow portion on the inside of the holding pieces 9, 9 in a space 11, 11. Also, as best shown in FIG. 3, windows 13 are provided alternately in the axial direction of the shank 3. Forming such windows allows the hollow portion to be formed in the shank by use of split molds. A rib 14 is formed between the first holding portion 5 and the shank 3 to enhance a coupling strength therebetween. An insertion tube 15 is disposed at the end (lower end) of the shank 3 at which the first holding portion 5 is provided. The insertion tube 15 is adapted to be inserted axially into the hollow portion of the shank 3 from the side of the first holding portion 5 to the side of the second holding portion 6 or the holding pieces 9. The insertion tube 15 is integrally held to the shank 3 through a connection piece 17 extending from a shank portion adjacent to the first holding portion 5. More specifically, a pair of the connection pieces 17 extend from opposite positions of the shank diametrically opposed to each other. Each of the connection pieces includes a first hinge 18 thinned at a connected section to the shank 3, a second hinge 19 thinned at another connected section to the lower end of the insertion tube 15, and a third hinge 20 thinned at an intermediate section between both the hinges 18 and 19. Thus, the insertion tube 15 is held in a posture and position so that the insertion tube can be slid into the hollow portion of the shank along the axis of the shank 3 from the side of the first holding portion 5 to the side of the second holding portion or the holding pieces 9. Each connection piece 17 connected by three hinges may be folded in the form of a pantograph by pushing in the insertion tube 15. When the insertion tube 15 is pushed upward in FIG. 1, the axis of the insertion tube 15 may be aligned with the axis of the shank, and this state may be maintained to reliably prevent the failure in inserting the insertion tube 15.

As shown in FIG. 7, the insertion tube 15 has substantially the same overall length as the overall thickness of the attachment member 2, and the sectional profile of the insertion tube is formed to match with the cross section of the hollow portion of the shank 3. The insertion tube 15 according to the first embodiment includes an upper portion 21 acting to the insertion tube engagement portion 10 of the holding pieces 9, a lower portion 23 provided with engagement pawls 22 which are adapted to engage with a stud bolt, and a flange 25 adapted to facilitate the acceptance of the stud bolt and stably seat on a panel such as an automobile body to which the stud bolt is fixed. The upper surface of the upper portion 21 of the insertion tube 15 is formed in a raised portion 26 having a slant face and adapted to contact the insertion tube engagement portion 10 of each holding piece 9. An engagement pawl 27 flexibly extending radially and outward is provided at the intermediate position of the insertion tube 15. The engagement pawl 27 is adapted to engage with the edge of one of the windows 13 of the shank 3 to hold the insertion tube 15 at the position where the insertion tube 15 secures the holding pieces 9 at the holding position. While a single engagement pawl 27 is used in this embodiment, any number or shape may be selected as long as it can secure the insertion tube 15 in the shank 3. As shown in FIG. 6, the slant face 29 of the raised portion 26 of the insertion tube 15 is contacted with the slant face of the insertion tube engagement portion 10 and this state is maintained as-is. Thus, the holding pieces 9 are kept in pressing the surface of the attachment member 2.

In the first embodiment, the insertion tube 15 includes a hollow portion to allow a stud bolt to be inserted therein from the side of the flange 25. The insertion tube 15 also includes, at the lower portion 23, the pair of engagement pawls 22 adapted to engage with a thread of the stud bolt. The ends of the engagement pawls 22 are located outside the outer periphery of the insertion tube 15 before the insertion tube 15 is inserted into the shank 3 (the state of FIG. 1). Thus, even if the stud bolt is inserted into the insertion tube 15 in that state, the ends of the engagement pawls 22 are not engaged with the stud bolt. This may provide low insertion resistance. When the insertion tube 15 is inserted into the hollow portion of the shank 3, the engagement pawls 22, 22 are moved toward the inside or hollow portion of the insertion tube 15 by the inner wall of the shank 3 to position the ends of the engagement pawls 22 at the inside beyond the inner wall of the hollow portion of the insertion tube 15. Thus, each engagement pawl 22 may be reliably engaged with the thread of the stud bolt. The flange 25 is formed in a shape widen toward its end to facilitate receiving the end of the stud bolt and guiding the end of the stud bolt to the hollow potion of the insertion tube.

With reference to FIGS. 5 to 7, the steps of attaching the holding fastener 1 having the above structure to the attachment member 2 such as a silencer board, and attaching this attachment member 2 such as a silencer board to a panel 30, such as an automobile body, being another mounting member will now be described. Referring to FIG. 5, where the holding pieces 9 are located at the insertion position, the holding pieces 9 are inserted into the mounting hole 31 of the attachment member 2 with making the holding pieces 9 forefront. In this insertion operation, since the silencer board is substantially soft in nature, as pushing the shank 3 into the mounting hole 31, the first holding portion 5 presses the contact surface (the lower surface in FIG. 5) of the attachment member 2 upward to form a pocket 33. When the holding fastener 1 is further pressed into the mounting hole 31, the movement of the first holding portion 5 is stopped, and the insertion tube 15 is slidably inserted into the shank 3 as deforming the connection piece 17 in the form of the pantograph. As shown in FIG. 6, in the last stage of the sliding of the insertion tube 15, the end of the insertion tube 15 contacts the insertion tube engagement portion 10 of the holding pieces 9. Then, the slant face 29 of the insertion tube 15 contacts the slant face of the insertion tube engagement portion 10 as folding down each holding piece 9, and the holding pieces 9 keeps this holding position. In this state, the engagement pawl 27 engages with the edge of the window 13 of the shank 3. Thus, the insertion tube 15 is secured at this position to secure the holding pieces 9 at the holding position. As a result, the holding fastener 1 is assembled to the attachment member 2. This assembling operation may be readily carried out only by pushing in the holding fastener 1 and by operating from one side of the attachment member. When the insertion tube 15 is located in the hollow portion of the shank 3, the engagement pawls 22, 22 are moved in the inside or hollow portion of the insertion tube 15 and the end of each engagement pawl 22 is positioned at the inside beyond the inner wall of the insertion tube 15.

After assembled the holding fastener 1 to the attaching member 2, the attaching member 2 may be attached to the panel 30 such as an automobile body by the steps of aligning the flange 25 of the holding fastener 1 assembled in the attachment member 2 with the end of the stud bolt 34 projectingly disposed on the panel 30, guiding the end of the stud bolt into the inlet of the hollow portion of the insertion tube 15, and pushing it into the attachment member as-is. Since the inner surface of the flange 25 is formed in a bugle-like (bell-like) shape, the end of the stud bolt 34 may be readily guided within the insertion tube 15. The stud bolt 34 is inserted into the insertion tube 15 by pushing in the attachment member after the guiding operation, and the engagement pawls 22, 22 engage with the thread of the stud bolt 34. Thus, the attachment member is assembled to the panel 30 as shown in FIG. 7.

Figure 8:
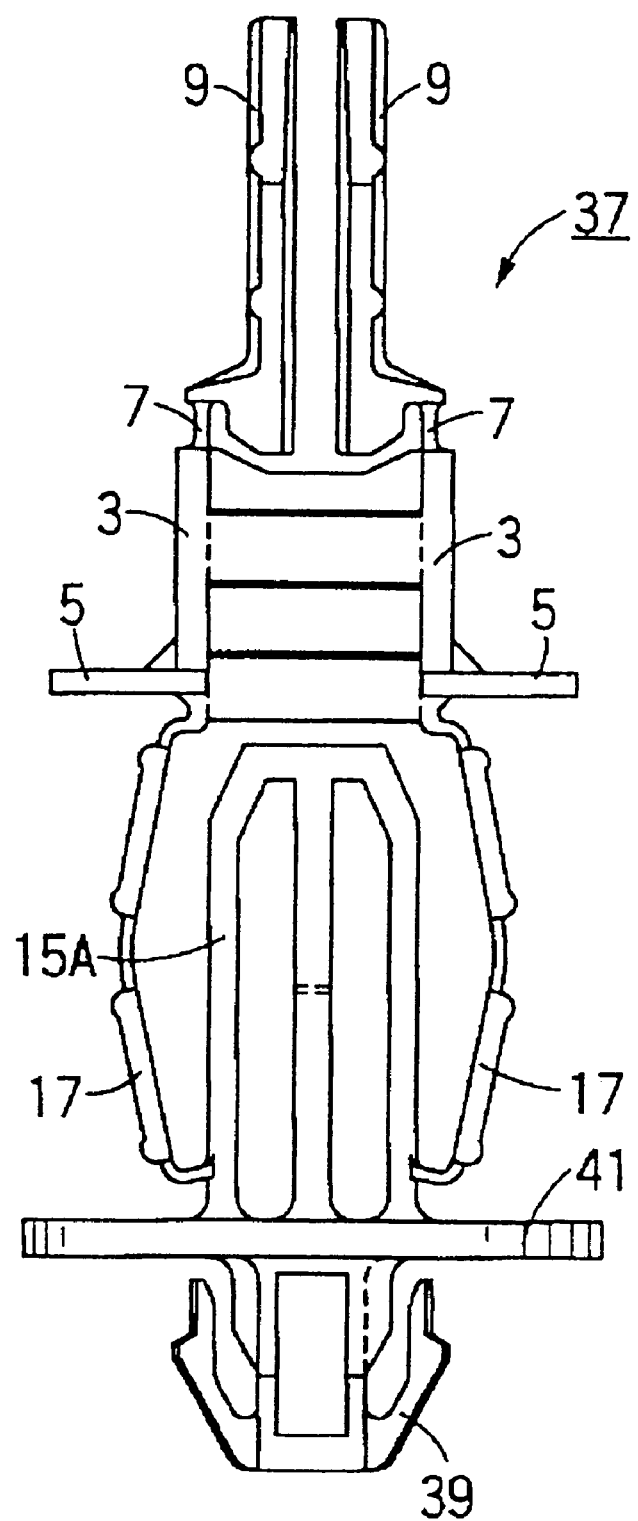
FIG. 8 is a front view of a holding fastener according to a second embodiment of the present invention.
Figure 9:
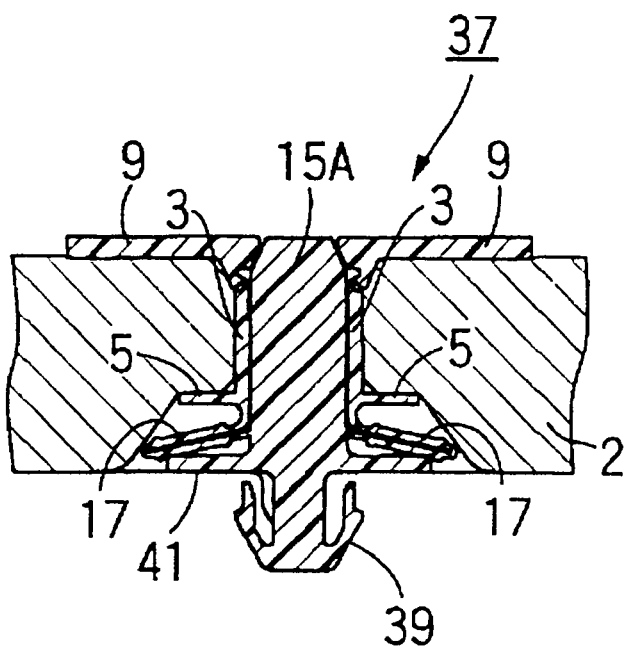
FIG. 9 is a front sectional view of the holding fastener according to the second embodiment of the present invention after being collapsed into an attachment member.
Figure 10:
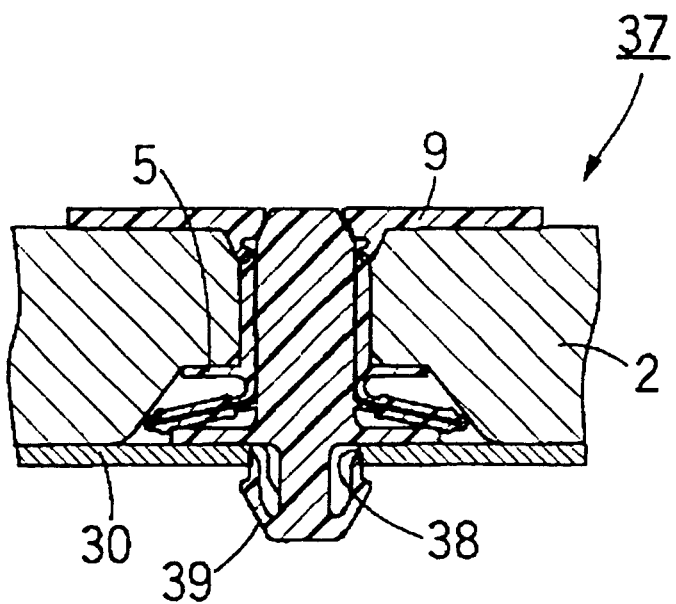
FIG. 10 is a front sectional view of the holding fastener according to the second embodiment of the present invention as shown in FIG. 9 with the attachment member attached to another mounting member.

FIGS. 8 to 10 show a holding fastener 37 according to a second embodiment of the present invention wherein like components will have the same reference characters as were used for the first embodiment of the present invention. This holding fastener 37 is different from the holding fastener 1 of the first embodiment and used in case that a panel 30 as another mounting member (see FIG. 10) is formed with a mounting hole 38 in stead of the stud bolt. The holding fastener 37 comprises a shank 3 adapted to be inserted into a mounting hole of the attachment member, a first holding portion 5 disposed at one end of the shank and adapted to extend radially and outward from the mounting hole of the attachment member to hold one surface of the attachment member, and a holding piece 9 as a second holding portion disposed at the other end of the shank 3 and adapted to hold the other surface of the attachment member. The holding piece 9 may be pivoted or rotated about a hinge 7 between the insertion position extending along the axis of the shank 3 and the holding position extending orthogonal to the axis of the shank. The shank 3 includes a hollow portion. An insertion tube 15A is disposed at the lower end of the shank 3. The insertion tube 15A is adapted to be inserted axially into the hollow portion of the shank from the side of the first holding portion 5 to the side of the holding piece 9. As noted above, the above structure is the same as that of the holding fastener 1 of the first embodiment. While the shape of the insertion tube 15A is somewhat different from that of the holding fastener 1 of the first embodiment, major functions are the same. Two embodiments have in common in that the insertion tube is held in a posture and position that the insertion tube can be slid along the axis of the shank by a pair of connection pieces 17 extending from a section of the shank adjacent to the first holding portion 5. Thus, these descriptions will not be repeated.

In the holding fastener 37, the insertion tube 15A includes an anchor leg engagement portion 39 as fastening means for attaching the attachment member 2 to the panel 30 as another mounting member, and the anchor leg engagement portion 39 is disposed at the end (lower end) on the opposite side of the end (upper end) of the insertion tube 15A inserted into the shank 3. This anchor leg engagement portion 39 is inserted into the mounting hole to assemble the holding fastener 37 to the panel 30. Since no stud bolt is engaged with the holding fastener 37, any structure for engaging the stud bolt is eliminated and the insertion tube 15A is formed in a tubular configuration. A flange 41 for engaging with the panel 30 is formed in the upper surface of the anchor leg engagement portion 39. With reference to FIGS. 9 and 10, the steps of attaching the holding fastener 37 having the above structure to the attachment member 2 will be described. In FIG. 9, the steps of attaching the holding fastener 37 to the attachment member 2 are the same as those of the holding fastener 1 of the first embodiment. Thus, these descriptions will be omitted. In FIG. 10, the attachment member 2 having the assembled holding fastener 37 is attached to the panel 30 as another mounting member. The attachment member 2 may be readily assembled to the panel 30 by inserting the anchor leg engagement portion 39 protruding from the attachment member 2 into the mounting hole 38 of the panel 30. It is apparent that any suitable fastening device may be selectively applied in stead of the anchor leg engagement portion 39. When the anchor leg engagement portion 39 is formed in a detachable configuration, removal of the silencer board can be performed.

According to the present invention, the second holding portion is located at the opposite side to the first holding portion which holds one surface of the attachment member and is composed of the holding piece connected with the shank though the hinge to allow the second holding portion to be rotated from the insertion position extending along the axis of the shank to the holding position extending orthogonal to the axis of the shank. The insertion tube is adapted to be inserted axially into a hollow portion of the shank from the side of the first holding portion to the side of the second holding portion. The holding piece and the insertion tube are cooperatively formed to allow the holding piece to be rotated from the insertion position to the holding position and to be locked at the holding position by the end of the insertion tube inserted into the hollow portion of the shank. Thus, only by inserting the shank into the mounting hole from one side of the attachment member and inserting the insertion tube into the shank from the same side of the attachment member, the holding piece is folded down to the holding position at the side of the end of the shank to contact in parallel with the surface of the attachment member and is locked to the attachment member as-is in corporation with the first holding portion. In addition, since the holding piece contacts in parallel with the surface of the attachment member, the projection over the attachment member is minimized to provide a space saving assembly.

In general, the above identified embodiments are not to be construed as limiting the breadth of the present invention. It will be understood that modifications and other alternative constructions may become apparent within the scope of the invention as defined in the appended claims.

What is claimed is:

1. A holding fastener to be connected to an attachment member comprising:
   a shank adapted to be inserted into a mounting hole of the attachment member;
   a first holding portion disposed at one end of the shank and adapted to extend radially and outward from the mounting hole of the attachment member to hold one surface of the attachment member;
   a second holding portion disposed at the other end of the shank and adapted to hold the other surface of the attachment member, the second holding portion including a holding piece connected to the shank through a hinge to allow the holding piece to be rotated between an insertion position that extends along the axis of the shank and a holding position that extends orthogonal to the axis of the shank; the shank includes a hollow portion;
   an insertion tube is provided at the one end of the shank and is adapted to be inserted axially into the hollow portion of the shank from the side of the first holding portion to the side of the second holding portion, wherein the holding piece and the insertion tube are cooperatively formed so that the end of the insertion tube inserted into the hollow portion of the shank allows the holding piece to be rotated from the insertion position to the holding position to be locked at the holding position; and
   the insertion tube is integrally held to the shank through a connection piece extending from a portion of the shank adjacent to the first holding portion.

2. A holding fastener as defined in claim 1, wherein:
   the holding piece is a pair of holding pieces opposed to each other in the diametrical direction of the shank.

3. A holding fastener as defined in claim 2, wherein:
   the upper section of each of the holding pieces adjacent to the hinge is formed as an insertion tube engagement portion in the insertion position, wherein the insertion tube engagement portion is adapted to be contacted with and pushed out by the end of the insertion tube and to rotate each the holding piece from the insertion position to the holding position about the hinge so as to lock each the holding piece against the upper surface of the attachment member.

4. A holding fastener as defined in claim 1, wherein:
   a pair of the connection pieces are provided opposed to each other in the diametrical direction of the shank, wherein each of the connection piece including thin hinges at a first connected section to the shank, a second connected section is formed on the insertion tube and an intermediate section between both the first and second connected sections, wherein the insertion tube is held in a posture and a position so that the insertion tube can be axially slid into the shank from the side of the first holding portion to the side of the second holding portion.

5. A holding fastener to be connected to an attachment member comprising:

a shank adapted to be inserted into a mounting hole of the attachment member;

a first holding portion disposed at one end of the shank and adapted to extend radially and outward from the mounting hole of the attachment member to hold one surface of the attachment member;

a second holding portion disposed at the other end of the shank and adapted to hold the other surface of the attachment member, the second holding portion including a holding piece connected to the shank through a hinge to allow the holding piece to be rotated between an insertion position that extends along the axis of the shank and a holding position that extends orthogonal to the axis of the shank; the shank includes a hollow portion;

an insertion tube is provided at the one end of the shank and is adapted to be inserted axially into the hollow portion of the shank from the side of the first holding portion to the side of the second holding portion, wherein the holding piece and the insertion tube are cooperatively formed so that the end of the insertion tube inserted into the hollow portion of the shank allows the holding piece to be rotated from the insertion position to the holding position to be locked at the holding position;

wherein the insertion tube includes a hollow portion to allow a stud bolt to be inserted thereinto, wherein the insertion tube includes an engagement pawl adapted to be engaged with a thread of the stud bolt; and wherein the end of the engagement pawl is located outside the outer periphery of the insertion tube before the insertion tube is inserted into the shank; and when the insertion tube is inserted into the shank, the engagement pawl is moved toward the inside of the insertion tube by the inner wall of the shank to position the end of the engagement pawl at the inside beyond the inner wall of the hollow portion of the insertion tube.

6. A holding fastener as defined in claim 1, wherein the insertion tube includes fastening means for attaching the attachment member to a mounting member, the fastening means provided at the end on the opposite side of the end of the insertion tube inserted into the shank.

7. A holding fastener to be connected to an attachment member comprising:

a shank adapted to be inserted into a mounting hole of the attachment member;

a first holding portion disposed at one end of the shank and adapted to extend radially and outward from the mounting hole of the attachment member to hold one surface of the attachment member;

a second holding portion disposed at the other end of the shank and adapted to hold the other surface of the attachment member, the second holding portion including a holding piece connected to the shank through a hinge to allow the holding piece to be rotated between an insertion position that extends along the axis of the shank and a holding position that extends orthogonal to the axis of the shank; the shank includes a hollow portion;

an insertion tube is connected integrally to the one end of the shank and is adapted to be inserted axially into the hollow portion of the shank from the side of the first holding portion to the side of the second holding portion, wherein the holding piece and the insertion tube are cooperatively formed so that the end of the insertion tube inserted into the hollow portion of the shank allows the holding piece to be rotated from the insertion position to the holding position to be locked at the holding position; and wherein the shank is provided with a window, and the insertion tube is provided with an engagement pawl which is adapted to engage the window of the shank when the insertion tube is inserted into the hollow portion of the shank.

* * * * *